(12) United States Patent
Miserque et al.

(10) Patent No.: US 7,037,977 B2
(45) Date of Patent: May 2, 2006

(54) POLYETHYLENE PIPE RESINS AND PRODUCTION THEREOF

(75) Inventors: Olivier Miserque, Mont-Saint-Guibert (BE); Jacques Michel, Seneffe (BE); Marc Dupire, Mons (BE); Fabian Siberdt, Brussels (BE); Jean-Louis Costa, Grimbergen (BE); Serge Bettonville, Crisnée (BE)

(73) Assignees: Solvay Polyolefins Europe-Belgium, Brussels (BE); TOTAL Petrochemicals Research Feluy, Feluy (BE)

( * ) Notice: Subject to any disclaimer, the term of this patent is extended or adjusted under 35 U.S.C. 154(b) by 0 days.

(21) Appl. No.: 10/415,218

(22) PCT Filed: Oct. 25, 2001

(86) PCT No.: PCT/EP01/12420

§ 371 (c)(1),
(2), (4) Date: Apr. 19, 2004

(87) PCT Pub. No.: WO02/34829

PCT Pub. Date: May 2, 2002

(65) Prior Publication Data

US 2004/0181010 A1    Sep. 16, 2004

(30) Foreign Application Priority Data

Oct. 27, 2000   (EP)   ................................. 00203746

(51) Int. Cl.
*C08L 23/04*   (2006.01)
*C08F 10/02*   (2006.01)

(52) U.S. Cl. ...................................... 525/191; 525/191
(58) Field of Classification Search ................ 525/191, 525/240, 65

See application file for complete search history.

(56) References Cited

U.S. PATENT DOCUMENTS

| 4,461,873 A | 7/1984 | Bailey et al. |
| 5,306,775 A | 4/1994 | Martin et al. |
| 6,346,575 B1 | 2/2002 | Debras et al. |
| 6,380,311 B1 | 4/2002 | Razavi et al. |
| 6,579,922 B1 | 6/2003 | Laurent |

FOREIGN PATENT DOCUMENTS

| EP | 0881237 A1 | 12/1998 |
| EP | 0989141 A1 | 3/2000 |
| WO | WO 00/60001 A1 | 10/2000 |

*Primary Examiner*—Caixia Lu
(74) *Attorney, Agent, or Firm*—William D. Jackson

(57) ABSTRACT

A polyethylene resin comprising a blend of from 35 to 49 wt % of a first polyethylene fraction of high molecular weight and 51 to 65 wt % of a second polyethylene fraction of low molecular weight, the first polyethylene fraction comprising a linear low density polyethylene having a density of up to 0.928 g/cm$^3$, and an HLMI of less than 0.6 g/10 min and the second polyethylene fraction comprising a high density polyethylene having a density of at least 0.969 g/cm$^3$, and an MI$_2$ of greater than 100 g/10 min, and the polyethylene resin, having a density of greater than 0.951 g/cm$^3$ and an HLMI of from 1 to 100 g/10 min.

27 Claims, No Drawings

POLYETHYLENE PIPE RESINS AND PRODUCTION THEREOF

The present invention relates to polyethylene resins, especially suitable for use as pipe resins, and to a process for producing such resins. The present invention also relates to the use of polyethylene compounds comprising such resins for the manufacture of pipes and fittings. The present invention yet further relates to polyethylene pipes and fittings.

Polyolefins such as polyethylenes which have high molecular weight generally have improved mechanical properties over their lower molecular weight counterparts. However, high molecular weight polyolefins can be difficult to process and can be costly to produce.

For many HDPE applications, polyethylene with enhanced toughness, strength and environmental stress cracking resistance (ESCR) is important. These enhanced properties are more readily attainable with high molecular weight polyethylene. However, as the molecular weight of the polymer increases, the processibility of the resin decreases. By providing a polymer with a broad or bimodal MWD, the desired properties that are characteristic of high molecular weight resin are retained while processability, particularly extrudability, is improved.

There are several methods for the production of bimodal or broad molecular weight distribution resins: melt blending, reactor in series configuration, or single reactor with dual site catalysts. Melt blending, suffers from the disadvantages brought on by the requirement of complete homogenisation and high cost. Use of a dual site catalyst for the production of a bimodal resin in a single reactor is also known.

Metallocene catalysts are known in the production of polyolefins. For example, EP-A-0619325 describes a process for preparing polyolefins such as polyethylenes having a multimodal or at least bimodal molecular weight distribution. In this process, a catalyst system which includes at least two metallocenes is employed. The metallocenes used are, for example, a bis(cyclopentadienyl) zirconium dichloride and an ethylene-bis(indenyl) zirconium dichloride. By using the two different metallocene catalysts in the same reactor, a molecular weight distribution is obtained which is at least bimodal.

EP-A-0881237 discloses the production of bimodal polyolefins with metallocene catalysts in two reaction zones. The metallocene catalyst component comprises a bis-tetrahydro indenyl compound of the general formula $(IndH_4)_2R''MQ_2$ in which each Ind is the same or different and is indenyl or substituted indenyl, R" is a bridge which comprises a $C_1$–$C_4$ alkylene radical, a dialkyl germanium or silicon or siloxane, or an alkyl phosphine or amine radical, which bridge is substituted or unsubstituted, M is a Group IV metal or vanadium and each Q is hydrocarbyl having 1 to 20 carbon atoms or halogen. That specification discloses that the density of the multimodal polyolefin resins particularly falls in the range 0.9 to 0.97 g/ml, preferably 0.92 to 0.97 g/ml and that the HLMI of the polyolefin resins particularly falls within the range 0.1 to 45,000 g/10 min, preferably in the range 0.4 to 45,000 g/10 min. Thus, that specification discloses the production of polyolefin resins having a wide variety of properties.

EP-A-0989141 discloses a process for the preparation of polyethylenes having a multimodal molecular weight distribution. The catalyst may employ a metallocene catalyst comprising a bis-tetrahydro indenyl compound as disclosed in EP-A-0881237. The specification discloses the production of pipe resins. Although the pipe resins disclosed had good mechanical properties, there is still a need to improve the mechanical properties. In Example 1 of that specification, the polyethylene resin chemical blend (in its extruded form, which means the polyethylene resin together with additional additives such as pigments, fillers and antioxidants) had a density of 0.956 g/ml which in turn means that the polyethylene resin per se had a density significantly less than 0.95 g/ml. There is a need to produce a polyethylene resin having improved mechanical properties yet with good processibility.

Polyethylene resins are known for the production of pipes and fittings. Pipe resins require high stiffness (creep rupture strength), combined with a high resistance against slow crack growth as well as resistance to crack propagation yielding impact toughness. However, there is the need to improve the creep rupture strength of currently available pipe resins, keeping the resistance against slow crack growth and the rapid crack propagation at least at a constant level. This would allow to increase the pressure rating of such pipes.

Polyethylene pipes are widely used as they are lightweight and can be easily assembled by fusion welding. Polyethylene pipes also have a good flexibility and impact resistance, and are corrosion free. Unless polyethylene pipes are reinforced, they are however limited in their hydrostatic resistance by the inherent low yield strength of polyethylene. The higher the density of the polyethylene, the higher will be the long term hydrostatic strength. Pipe resins are known in the art which are referred to by the names "PE 80" and "PE 100". This classification is described in ISO 9080 and ISO 12162. These are polyethylene resins which when used for the formation of pipes of specific dimensions, survive a long term pressure test at different temperatures for a period of 5,000 hours. Extrapolation shows that they have a 20° C.—50 years stress resistance of at least 8 and 10 MPa. There is a need in the art for polyethylene pipe resins which exceed these test requirements. Currently, for polyethylene the highest hydrostatic strength which can be tolerated based on an extrapolation of the hoop stress/lifetime relationship at a temperature of 20° C. for a period of 50 years is 10 MPa. This corresponds to a PE 100 resin. The density of the current unpigmented PE 100 is close to 0.95g/cm$^3$ typically from 0.949 to 0.951 g/cm$^3$). Polyethylene resins containing the conventional amount of black pigments have densities from about 0.958 to 0.960 g/cm$^3$.

It is known in the art that the key components for a good PE 100 resin are the combination of a low molecular weight high density polyethylene with little or no short chain branching (SCB) due to comonomer incorporation and a linear low density polyethylene (LLDPE) resin with high molecular weight and SCB.

Usually, polyethylene resins of such composition are produced in a cascade reactor process using Ziegler-Natta catalysts. Another variant might be to blend different polyethylene fluffs and extrude them to form a physical blend, as opposed to a chemical blend produced using a cascade reactor. However, physical blending often leads to a poor mixing of the melts, which leaves large high molecular weight microscopic particles (referred to as gels in the art) embedded in the final product. The weight fraction of the LLDPE resin is around 50% of the blend. The low molecular weight high density polyethylene (HDPE) confers a high crystallinity, and thus a high rigidity and resistance to creep for the blend, and depresses the melt viscosity of the blend. The high molecular weight LLDPE provides the polyethylene blend with a high density of tie-molecules as a result of the short chain branching, which are responsible for the enhanced environmental stress crack growth resistance (ESCR) observed in these blends.

The present invention aims to overcome the disadvantages of the prior art, in particular by providing improved polyethylene pipe resins.

The present invention provides a polyethylene resin comprising from 35 to 49 wt % of a first polyethylene fraction of high molecular weight and from 51 to 65 wt % of a second polyethylene fraction of low molecular weight, the first polyethylene fraction comprising a linear low density polyethylene having a density of up to 0.928 g/cm$^3$, and an HLMI of less than 0.6 g/10 min and the second polyethylene fraction comprising a high density polyethylene having a density of at least 0.969 g/cm$^3$ and an MI$_2$ of greater than 100 g/10 min, and the polyethylene resin having a density of greater than 0.951 g/cm$^3$ and an HLMI of from 1 to 100 g/10 min.

The present invention further provides the use of such a polyethylene resin for the manufacture of pipes and fittings.

The invention also provides a pipe or a fitting comprising the polyethylene resin of the invention.

The present invention further provides a process for the preparation of a polyethylene resin having a bimodal molecular weight distribution which comprises:

(i) contacting ethylene monomer and a first co-reactant with a catalyst system in a first reaction zone under first polymerisation conditions to produce a first polyethylene; and (ii) contacting ethylene monomer and a second co-reactant with a catalyst system in a second reaction zone under second polymerisation conditions to produce a second polyethylene different from the first polyethylene;

wherein the first and second polyethylenes are blended together, to form a polyethylene resin comprising from 35 to 49 wt % of a first polyethylene fraction of high molecular weight and from 51 to 65 wt % of a second polyethylene fraction of low molecular weight, the first polyethylene fraction comprising a linear low density polyethylene having a density of up to 0.928 g/cm$^3$, and an HLMI of less than 0.6 g/10 min and the second polyethylene fraction comprising a high density polyethylene having a density of at least 0.969 g/cm$^3$ and an MI$_2$ of greater than 100 g/10 min, and the polyethylene resin having a density of greater than 0.951 g/cm$^3$ and an HLMI of from 1 to 100 g/10 min, wherein one of the co-reactants is hydrogen and the other is a comonomer comprising a 1-olefin containing from 3 to 12 carbon atoms.

The present invention yet further provides a high strength pipe comprising a polyethylene resin having a multimodal molecular weight distribution and a density of at least 0.951 g/cm$^3$, the pipe having a creep resistance measured according to ISO 1167 on a 32 mm diameter SDR 11 pipe of at least 500 hours at 20° C. and 13 MPa and a slow crack growth resistance measured according to the full notch creep test of ISO DIS 16770 of at least 500 hours measured at 80° C. and 5 MPa.

In accordance with the invention there is therefore provided a pipe resin having mechanical properties greater than the PE100 grade, i.e. a pipe resin which when transformed in the form of a pipe would withstand the pressurised test at minimum hoop stresses up to 11.2 MPa, even up to 12.5 MPa for at least 50 years at 20° C. A resin, when transformed in the form of a pipe, withstanding such a pressure of 12.5.MPa would be called a "PE125 grade" resin, using the current normal terminology in the art.

The resin according to the present invention preferably comprises at least 55% by weight of the second polyethylene fraction of low molecular weight, most preferably at least 56 weight %.

The resin according to the present invention preferably comprises not more than 45% by weight of the first polyethylene fraction of high molecular weight, most preferably at most 44 weight %.

Preferably, for the high density fraction the MI$_2$ is from 200 to 1000 g/10 min, more preferably from 300 to 1000 g/10 min.

Preferably, for the low density fraction, the HLMI is from 0.001 to 0.5 g/10 min, more preferably from 0.01 to 0.35 g/10 min.

For the low density fraction, the density is preferably from 0.908 to 0.927 g/cm$^3$, more preferably from 0.912 to 0.926 g/cm$^3$.

For the high density fraction, the density is preferably from 0.970 to 0.990 g/cm$^3$, more preferably from 0.971 to 0.980 g/cm$^3$.

Preferably, the density of the resin is from 0.952 to 0.960 g/cm$^3$, more preferably from 0.954 to 0.958 g/cm$^3$. Preferably, for the polyethylene resin, the HLMI is from 5 to 90 g/10 min, more preferably from 10 to 80 g/10 min.

In this specification the melt index MI$_2$ and high load melt index HLMI are measured in accordance with ASTM D-1238 at 190° C. with respective loads of 2.16 and 21.6 kg.

In this specification the density is measured in accordance with ISO 1183.

For the high density polyethylene fraction, the polydispersity index D (represented by the ratio Mw/Mn as determined by gel permeation chromatography (GPC)) is preferably from 2 to 4. For the linear low density polyethylene fraction of high molecular weight the value of polydispersity index D is preferably from 3 to 6.

Preferably, the polyethylene resin has a molecular weight distribution Mw/Mn from 8 to 30.

Preferably, the low density fraction is a copolymer of ethylene and another alpha-olefin containing from 3 to 12 carbon atoms. More preferably, the low density fraction is a copolymer of ethylene and butene, methylpentene, hexene and/or octene.

Preferably, the high density fraction is an ethylene homopolymer.

The present inventors have found that with such blends of polyethylene, having such a specific composition, molecular weight and density, this can lead to a marked improvement of the mechanical properties when the resin is used as a pipe resin, while conserving or improving processing behaviour as compared to known pipe resins. Typically, the pipe resins produced in accordance with the invention can exhibit a higher slow crack growth resistance and impact strength at low temperature while having a better creep resistance than the currently obtainable PE 100 type resins.

The resins according to the invention are therefore well suited for the manufacture of pipes, in particular high pressure pipes, and for the manufacture of fittings. The present invention therefore also concerns the use of the polyethylene resins according to the invention for the manufacture of pipes and fittings and the pipes and fittings thereby obtained. When used for the manufacture of pipes, the resins are most often blended with usual additives such as anti-oxidants, anti-acids and colorants.

In this specification in order to assess the slow crack growth resistance of pipe resins, an environmental stress cracking resistance (ESCR) Bell test in accordance with ASTM-D-1693 at 70° C., with 35% Antarox CO630 was employed, and the times to failure were measured. The slow crack growth resistance was also tested by a full notch creep test (FNCT) according to ISO DIS 16770 in which the time for failure was recorded for a circumferentially notched specimen having a 10 mm×10 mm cross section, the specimen having been submitted to a net tensile strength of 5 MPa at a temperature of 80° C. in a 2% solution of Arkopal N100. For some of the resins, the slow crack growth resistance was further tested by a notched pipe test (NPT) in accordance with ISO 13479 under a stress of 4.6 MPa at 80° C. using pipes of 110 mm diameter (SDR11).

Furthermore, the pipe resins produced in accordance with the invention exhibit good resistance to rapid crack propagation. In order to assess the resistance of the resins to rapid crack propagation (RCP) pipes having a diameter of 110 mm (SDR 11) were subjected to the test according to ISO DIS 13477 (the small scale steady state (S4) test) at a pressure of 10 bars to determine the critical temperature of fracture. A Charpy impact energy test was also carried out at a temperature of −25° C. using the procedures of ISO 180/1A.

Furthermore, the pipe resins according to the invention have a good creep resistance. The creep resistance was measured according to the test of ISO 1167 on 32 mm diameter SDR11 pipes to determine the lifetime prior to failure at a temperature of 20° C. and a pressure of 13 MPa. The creep resistance was further measured under the same conditions but at higher pressures, of respectively, 13.7 and 13.9 MPa.

Generally, the pipe resins produced in accordance with the invention exhibit a time to failure under the FNCT test specified in ISO DIS 16770 of at least 500 hours, indicating good slow crack growth resistance.

Moreover, more significantly the pipe resins produced in accordance with the invention have a very high ESCR resistance as measured by the Bell test, the failure times typically being greater than 500 hours, which are significantly higher than known resins.

The pipe resins according to the invention have a creep resistance measured according to ISO 1167 as specified above of at least 500 hours, most often above 1000 hours, for a temperature of 20° C. and a pressure of 13 MPa. The pipe resins generally have a creep resistance of at least 500 hours at 20° C. and 13.7 MPa. Most often, the pipe resins have a creep resistance of at least 100 hours at 20° C. and 13.9 MPa. The pipe resins produced in accordance with the invention generally have a creep resistance which is such that they can be assigned a minimum required strength (MRS) rating according to the ISO/TR 9080 standard which is higher than the MRS 10 rating (for PE100 resins), such as a MRS 11.2 rating or even a MRS 12.5 rating. This rating is determined according to a statistical method and the minimum required strength MRS is defined as a classified lower prediction limit (LPL) at a 97.5% confidence interval.

The invention therefore further relates to a high strength pipe of ethylene polymer having a multimodal molecular weight distribution and a density greater than 0.951 g/cm$^3$, the pipe having a creep resistance measured according to ISO 1167 of at least 500 hours at 20° C. and 13 MPa and a stress crack resistance measured according to full notch creep test of ISO DIS 16770 of at least 500 hours measured at 80° C. and 5 MPa.

The most preferred pipe resins in accordance with the invention, when prepared using a metallocene catalyst and most preferably when produced using a bis-tetrahydroindenyl (THI) metallocene catalyst, are also characterised by a higher shear-thinning behaviour than known bimodal PE 100 resins. This means less sagging of the polyethylene resins when being extruded at low shear rates when forming pipes, and good injection-moulding capability for the resins when used to produce injection moulded pipe fittings.

The polyethylene resins, according to the invention can be prepared by polymerising ethylene to produce two polyethylene fractions having different molecular weights thereby to produce high density and low density polyethylene fractions. The resultant blend has a bimodal molecular weight distribution.

The polyethylene resins in accordance with the invention produced with the preferred metallocene catalyst, and most preferably with the THI catalyst, have in general a lower capillary viscosity $\mu_2$ than commercial PE100 resins. Preferably, $\mu_2$ is less than 21,000 dPa.s, in contrast to known pipe resins produced using Ziegler-Natta catalysts, which typically have a $\mu_2$ greater than 21,000 dPa.s. $\mu_2$ is the value of capillary viscosity which is measured by extruding polymer by means of an extrusion device, which incorporates a piston in a cylinder, at a temperature of 190° C. through a cylindrical die of length 30 mm and diameter 2 mm at a constant speed corresponding to a shear rate of 100 s$^{-1}$ and by measuring the force transmitted by the piston during the descent of the piston. The cylinder and piston used by this test method meet the requirements of the cylinder/piston device used for fluidity index measurements according to the standard ASTM D 1238 (1996). The $\mu_2$ value is then calculated by using the equation: $\mu_2 = 23.61 \times Fp$ where Fp represents the mean force exerted by the piston during the measurement period and is expressed in decaNewtons (daN) whereas $\mu_2$ is expressed in dPa.s.

Furthermore, the polyethylene resins produced in accordance with the invention, and obtained with the preferred metallocene catalyst, and especially with the most preferred THI catalyst, have in general a dynamic viscosity $\eta_{0.01}$ at 0.01 radian/second which is much greater than 200,000 Pa.s. In contrast, known pipe resins produced using Ziegler-Natta catalysts have a $\eta_{0.01}$ less than 200,000 Pa.s. In addition, the polyethylene resins produced in accordance with the invention with the preferred metallocene catalysts, and most particularly with the most preferred THI catalyst, have in general a ratio $\eta_{0.01}/\eta_1$ greater than 8, preferably greater than 10 where $\eta_1$ is the dynamic viscosity at 1 radian/second, express in Pa.s. In contrast, known pipe resins produced using a Ziegler-Natta catalyst have a $\eta_{0.01}/\eta_1$ ratio typically much less than 8, most typically around 5.

Yet further, the polyethylene resins produced in accordance with the preferred metallocene catalysts, and especially with the most preferred THI catalyst, have in general the following relationships:

$$\eta_{0.01}/\eta_1 \text{ is greater than or equal to } \{(0.293 \times M_w/M_n) + 3.594\}$$

$$\eta_{0.01}/\eta_1 \text{ is greater than or equal to } \{(-0.302 \times HLMI) + 9.499\}$$

The determination of dynamic viscosity is made by using an oscillatory rheometer, preferably a Rheometric Scientific ARES rheometer. This method has been extensively described in the literature devoted to polymer rheology (see e.g. W. W. Graessley, Chapter 3 in Physical Properties of Polymers, 2nd Edition, ACS Professional Reference Book, Washington D.C., 1993).

The measurements are performed on a Rheometric Scientific ARES rheometer between two 25 mm diameter plates; the gap between the plates is between 1 and 2 mm, and is thoroughly adapted according to the suitable thickness of the polymer sample once this latter has been inserted between the plates and warmed up to 190° C. The gap value is then recorded to be taken into account by the calculation software.

The sample is then temperature-conditioned for a period of 5 minutes before the measurement is started. The measurement is performed, at 190° C. After temperature conditioning, the measurement starts by applying an oscillatory strain $\gamma^*(\omega,t) = \gamma_M e^{i\omega t}$, with a given amplitude $\gamma_M$ and a given frequency $\omega$ to the bottom plate via a precision motor, whereas the top plate is kept fixed. The amplitude $\gamma_M$ of this shear strain has been chosen in the linear zone of viscoelasticity of the polymer and is kept constant through the whole experiment. The oscillation frequency $\omega$ is varied through the range $[10^{-2}$–$10^{+2}]$ radian/second. The oscillating shear strain is translated inside the material into an oscillating shear stress $\sigma^*(\omega,t)$, which in-phase and out-of-phase components are recorded as functions of the frequency $\omega$, and used for the calculation of the complex modulus $G^*(\omega)$ as well as complex viscosity $\eta^*(\omega)$ of the polymer:

$$G^*(\omega) = \frac{\sigma^*(\omega, t)}{\gamma^*(\omega, t)} = G_m(\omega) \cdot e^{i\delta(\omega)} = G'(\omega) + i \cdot G''(\omega)$$

$$G_m(\omega) = \sqrt{G'^2(\omega) + G''^2(\omega)} \; ; \; \tan\delta(\omega) = \frac{G''(\omega)}{G'(\omega)}$$

$$\eta^*(\omega) = \eta'(\omega) - i \cdot \eta''(\omega) = \frac{G''(\omega)}{\omega} - i \cdot \frac{G'(\omega)}{\omega}$$

$$\|\eta^*(\omega)\| = \frac{\sqrt{G'^2(\omega) + G''^2(\omega)}}{\omega}$$

According to the Cox-Merz rule, the function of the absolute value of the complex viscosity $\|\eta^*(\omega)\|$ is the same as the conventional viscosity function, (capillary viscosity as a function of shear rate $\gamma$), if frequency is taken in rad/s. If this empiric equation is valid, the absolute value of the complex modulus corresponds to the shear stress in conventional (that is steady state) viscosity measurements.

In the present invention, the dynamic viscosities of the resin measured at 0.01 and 1 rad/s respectively according to the aforementioned method are defined as $\eta_{0.01} = \|\eta^*(0.01 \text{ rad/s})\|$ and $\eta_1 = \|\eta^*(1 \text{ rad/s})\|$.

The use of metallocene catalysts, for example the bis-tetrahydro indenyl metallocene catalyst enables the production of both low and high density fractions having narrow molecular weight distributions.

The polyethylene resins in accordance with the invention can outperform the current best available bimodal polyethylene resins of PE 100 grade for properties relating to the fabrication and use of polyethylene pipes. In particular, the polyethylene resins in accordance with the invention have better impact resistance, slow crack resistance and a higher creep resistance than current available PE 100 grade resins. In particular, the resins of the invention which are prepared with the preferred metallocene catalysts, in particular the THI catalysts, are also endowed with excellent rheological behaviour, that is they have a similar or lower viscosity at higher shear rates (typically around 100 s$^{-1}$) and a much higher viscosity at low shear rates (0.1 s$^{-1}$ or below). These resins provide a reduced sagging following extrusion of the pipe resin into a pipe together with an improvement of the injection moldability.

Within the ambit of the relationship between the weight fractions and density of the low and thigh density fractions, as a general rule any decrease of the density of the LLDPE should be compensated by an increase of the density of the HDPE. Since the density of the HDPE fraction generally increases with increase MI$_2$, a higher MI$_2$ will result. For certain blends, two or more weight fractions of LLDPE may satisfy the two essential criteria of HLMI and density.

The polyethylene resins according to the invention can be prepared by different methods, such as melt blending, reactor in series configuration or single reactor with dual site catalysts.

Preferably, the high density and low density fractions of the polyethylene resin according to the invention are produced in at least two separate reactors, most preferably two such reactors in series. In such a case, the high density fraction is preferably prepared first, so that the low density fraction is prepared in the presence of the high density fraction.

The resultant blend has a bimodal molecular weight distribution. The catalyst employed in the polymerisation process may be any catalyst(s) suitable for preparing the low and thigh density fractions. Preferably, the same catalyst produces both the high and low molecular weight fractions. For example, the catalyst may be a chromium catalyst a Ziegler-Natta catalyst, or most preferably a metallocene catalyst. The metallocene catalyst component preferably comprises a bis-tetrahydroindenyl compound (THI).

Preferably each catalyst system comprises (a) a metallocene catalyst component comprising a bis-tetrahydroindenyl compound of the general formula $(IndH_4)_2R''MQ_2$ in which each $IndH_4$ is the same or different and is tetrahydroindenyl or substituted tetrahydroindenyl, R'' is a bridge which comprises a $C_1$–$C_4$ alkylene radical, a dialkyl germanium or silicon or siloxane, or an alkyl phosphine or amine radical, which bridge is substituted or unsubstituted, M is a Group IV metal or vanadium and each Q is hydrocarbyl having 1 to 20 carbon atoms or halogen; and (b) a cocatalyst which activates the catalyst component.

The use of multiple reactors is a preferred aspect of the present invention. This will require a higher investment than for a single reactor system but is very conveniently done with the preferred metallocene catalyst systems employed in the present invention. With the preferred metallocene catalyst system, using two reactors in series conditions can be provided for the best resin properties.

It has been shown that the combination of low short chain branching (ideally no branching) in the low molecular part of the resin and high concentration in the high molecular part significantly improves the resin properties with respect to ESCR and impact strength.

With the preferred bis-tetrahydroindenyl catalyst, each bis-tetrahydroindenyl compound maybe substituted in the same way or differently from one another at one or more positions in the cyclopentadienyl ring, the cyclohexenyl ring and the ethylene bridge. Each substituent group may be independently chosen from those of formula $XR_v$ in which X is chosen from group IVB, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M. Substituetnts on the cyclopentadienyl ring preferably have R as hydrogen or CH3. More preferably, at least one and most preferably both cyclopentadienyl rings are unsubstituted.

In a particularly preferred embodiment, both indenyls are unsubstituted.

R" is preferably an ethylene bridge which is substituted or unsubstituted.

The metal M is preferably zirconium, hafnium or titanium, most preferably zirconium. Each Q is the same or different and may be a hydrocarbyl or hydrocarboxy radical having 1–20 carbon atoms or a halogen. Suitable hydrocarbyls include aryl, alkyl, alkenyl, alkylaryl or aryl alkyl. Each Q is preferably halogen. Ethylene bis(4,5,6,7-tetrahydro-1-indenyl) zirconium dichloride is a particularly preferred bis tetrahydroindenyl compound of the present invention.

The metallocene catalyst component used in the present invention can be prepared by any known method. A preferred preparation method is described in J. Organomet. Chem. 288, 63–67 (1985).

The cocatalyst which activates the metallocene catalyst component can be any cocatalyst known for this purpose such as an aluminium-containing cocatalyst, a boron-containing cocatalyst or a mixture of those. The aluminium-containing cocatalyst may comprise an alumoxane, an alkyl aluminium and/or a Lewis acid.

The alumoxanes used in the process of the present invention are well known and preferably comprise oligomeric linear and/or cyclic alkyl alumoxanes represented by the formula:

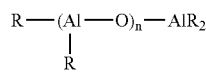 (I)

for oligomeric, linear alumoxanes and

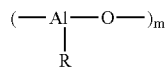 (II)

for oligomeric, cyclic alumoxanes,
wherein n is 1–40, preferably 10–20, m is 3–40, preferably 3–20 and R is a $C_1$–$C_8$ alkyl group and preferably methyl. Generally, in the preparation of alumoxanes from, for example, aluminium trimethyl and water, a mixture of linear and cyclic compounds is obtained.

Suitable boron-containing cocatalysts may comprise a triphenylcarbenium boronate such as tetrakis-pentafluorophenyl-borato-triphenylcarbenium as described in EP-A-0427696, or those of the general formula [L'–H]+[B $Ar_1$ $Ar_2$ $X_3$ $X_4$]— as described in EP-A-0277004 (page 6, line 30 to page 7, line 7).

Preferably, the same catalyst system is used in both steps of the cascade polymerisation process to produce a chemical blend of the high and low molecular weight fractions. The catalyst system may be employed in a solution polymerisation process, which is homogeneous, or a slurry process, which is heterogeneous. In a solution process, typical solvents include hydrocarbons with 4 to 7 carbon atoms such as heptane, toluene or cyclohexane. In a slurry process it is preferably to immobilise the catalyst system on an inert support, particularly a porous solid support such as talc, inorganic oxides and resinous support materials such as polyolefin. Preferably, the support material is an inorganic oxide in its finally divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalised polyolefins such as finely divided polyethylene.

Preferably, the support is a silica having a surface area comprised between 100 and 1000 m2/g and a pore volume comprised between 0.5 and 3 ml/g.

The amount of alumoxane and metallocenes usefully employed in the preparation of the solid support catalyst can vary over a wide range. Preferably the aluminium to transition metal mole ratio is in the range between 1:1 and 100:1, preferably in the range 5:1 and 70:1.

The order of addition of the metallocenes and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the metallocene catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane; and aromatics such as benzene, toluene, ethylbenzene and diethylbenzene.

Preferably the support material is slurried in toluene and the metallocene and alumoxane are dissolved in toluene prior to addition to the support material.

In one arrangement according to the present invention, each polyolefin is produced individually in a reactor, preferably a loop reactor, and mixed together by extrusion. The polyolefins may be mixed together by melt blending. In this way, the low molecular weight and high molecular weight parts of the polyolefin can be produced in separate reactors.

In a preferred arrangement, the product of a first cascade reaction zone, including the olefin monomer, is contacted with the second co-reactant and the catalyst system in a second cascade reaction zone to produce and mix the second polyolefin with the first polyolefin in the second reaction zone. The first and second reaction zones are conveniently interconnected reactors such as interconnected loop reactors or interconnected loop and continuously stirred reactors. It is also possible to introduce into the second reaction zone fresh olefin monomer as well as the product of the first reaction zone.

Because the second polyolefin is produced in the presence of the first polyolefin a multimodal or at least bimodal molecular weight distribution is obtained.

In one embodiment of the invention, the first co-reactant is hydrogen and the second co-reactant is the comonomer. Typical comonomers include hexene, butene, octene or methylpentene, preferably hexene.

In an alternative embodiment, the first co-reactant is the comonomer, preferably hexene. Because the metallocene catalyst components of the present invention exhibit good comonomer response as well as good hydrogen response, substantially all of the comonomer is consumed in the first reaction zone in this embodiment. Homopolymerisation takes place in the second reaction zone with little or no interference from the comonomer.

In another embodiment, hydrogen may be introduced in both the first and the second reactor.

The temperature of each reactor may be in the range of from 60° C. to 110° C., preferably from 70° C. to 90° C.

The invention will now be described in further detail with reference to the following non-limiting Examples.

EXAMPLE 1

A. Preparation of the Catalyst

The catalyst comprises ethylene bis(4,5,6,7-tetrahydro-1-indenyl) zirconium chloride metallocene catalyst supported on a silica support which had been treated with a cocatalyst comprising methylalumoxane (MAO).

Silica having a total pore volume of 1.56 ml/g and a surface area of 311 m$^2$/g was dried in a fluidised bed reactor for a period of 6 hours at a temperature of 150° C. under a nitrogen flow of 75 Nl/h. An amount of 10 g of the dried silica suspended in 100 ml of dry toluene at room temperature was introduced via a dropping funnel in to a 500 ml round bottomed flask equipped with a magnetic stirrer, and maintained under nitrogen gas. Thereafter, 40 ml of a 30 wt % solution of methylalumoxane (MAO) in toluene (thereby providing a 1.1 weight ratio between MAO and the silica) were slowly added to the silica suspension. The solution of MAO in toluene is commercially available from the company Witco. The resulting slurry was heated at a temperature of 110° for a period of 4 hours. The solid reaction product was then isolated by filtration, using a frit funnel of porosity value 3, and then washed three times with 100 ml of dried toluene and then three times with 100 ml of dry pentane. The catalytic support was then finally dried under vacuum to produce 21 g of a free flowing white powder.

Thereafter, for the deposition of the metallocene catalyst onto the support as described above, 19 g of the catalytic support was suspended in 200 ml of dry toluene in a 500 ml round bottle flask equipped with a magnetic stirrer and maintained under nitrogen. Then 1.21 g of ethylene bis(4,5,6,7-tetrahydro-1-indenyl) zirconium dichloride, also commercially available from the company Witco, were added to the suspension. The amount of the metallocene compound was selected so as to provide 6 wt % of the metallocene catalyst on the support, based on the weight of the support. The resulting yellow slurry was allowed to react for a period of 2 hours. The supported catalyst was then filtered off and washed with successive portions of 100 ml of dry toluene until a colourless filtrate was obtained. The catalyst was then washed three times with 100 ml of dry pentane and dried under vacuum. The resultant supported catalyst was obtained as 20.2 g of a pale yellow free flowing powder.

B. Preparation of the Low Molecular Weight (LMW) Polyethylene Fraction

Under a flushing of dry nitrogen gas 0.9 millimole of tri-isobutyl aluminium (TIBAL) and 900 ml of isobutane were introduced into a dry autoclave reactor having a volume of 3 litres and provided with an agitator. The temperature was raised to 80° C. and hydrogen gas was added. Ethylene gas was then introduced until a partial pressure of ethylene of 10×10$^5$ Pa was achieved. The amount of hydrogen previously introduced into the autoclave reactor was selected so as to obtain a final gas phase molar ratio of hydrogen to ethylene (H$_2$/C$_2$ molar ratio) of 0.0029 mol/mol.

The polymerisation was then started by flushing into the autoclave the solid catalyst, comprising 6 wt % of the supported ethylene bis(4,5,6,7-tetrahydro-1-indenyl) zirconium dichloride metallocene catalyst (the THI catalyst) prepared hereinabove, in 100 ml of isobutane. The temperature, partial pressure of ethylene, and the H$_2$/C$_2$ ratio were kept constant over the polymerisation period, which was 1 hour. The reaction was stopped by cooling down, and then venting, the reactor.

The low molecular weight polyethylene was then collected from the reactor. The properties of the low molecular weight polyethylene obtained are summarised in Table 1.

C. Preparation of the High Molecular Weight (MM) Polyethylene Fraction

The process for preparing the high molecular weight fraction was the same as that for preparing the low molecular weight fraction specified above in step B, except that instead of adding hydrogen after raising the temperature to 80° C., 10 g of 1-hexene comonomer were added and a different amount of ethylene was introduced, in order to obtain a partial pressure of ethylene of 8×10$^5$ Pa.

The high molecular weight ethylene-hexene copolymer obtained was collected from the reactor. The properties of the high molecular weight polyethylene fraction are summarised in Table 1.

D. Preparation of the Polyethylene Resin Blend

In order to prepare the blend of the low molecular weight and high molecular weight polyethylene fractions, 440 g of the low molecular weight polyethylene fraction obtained in step B were then blended with 360 g of the high molecular weight ethylene-hexene copolymer obtained in step C and together with 2.4 g of an anti-oxidant comprising Irganox B225 commercially available from the company CIBA Speciality Chemicals. The resulting blend was pelletised twice in an extruder (APV Baker MP19TC25).

The properties of the blended polyethylene resin thereby obtained are summarised in Table 1.

COMPARATIVE EXAMPLES 1 TO 15

In these Comparative Examples, Example 1 was again repeated except that, the polymerisation conditions, namely the molar ratio of hydrogen to ethylene (H$_2$/C$_2$) the 1-hexene content and the ethylene partial pressure in steps B and C were adapted in order to obtain ethylene polymers having different densities and/or melt indices and/or except that the proportions of the low molecular weight and high molecular weight polyethylene fractions used for making the polyethylene resin blends were changed. The composition and properties of the polyethylene resins thereby obtained are summarised also in Table 1.

EXAMPLE 2

A. Preparation of Metallocene Catalyst

The metallocene catalyst was the same as that employed in Example 1.

B. Preparation of the Low Molecular Weight (LMK) Polyethylene Fraction

An amount of 0.9 millimole of TIBAL and 900 ml of isobutane were introduced under a flushing of dry nitrogen into a dry autoclave reactor having a volume of 3 litres and provided with an agitator. The temperature was raised to 80° C. and hydrogen gas was added in order to obtain a final hydrogen/ethylene (H$_2$/C$_2$) molar ratio of 0.0058 mol/mol. Ethylene was then introduced until a partial pressure of ethylene of 10×10$^5$ Pa was obtained.

The polymerisation was started by flushing into the autoclave reactor the catalytic solid which was the same as that employed in Example 1 namely comprising 6 wt % of ethylene bis(4,5,6,7-tetrahydro-1-indenyl) zirconium dichloride on the MAO treated silica support in 100 ml of isobutane. The temperature, partial pressure of ethylene, and hydrogen/ethylene ratio was kept constant during the polymerisation period in order to obtain the desired amount of homopolymer. The reactor was then cooled down and vented until a total pressure of $0.5 \times 10^5$ Pa was reached. A very small sample of the low molecular weight polyethylene fraction was taken from the reactor in order to measure the density and melt index ($MI_2$) of the fraction. The reminder of the low molecular weight polyethylene fraction was left in the reactor.

C. Preparation of the High Molecular Weight (HMW) Polyethylene Fraction in the Presence of the Low Molecular Weight Fraction obtained in Step B.

The temperature of the reactor containing the low molecular weight polyethylene fraction was then raised up again to 80° C. and 10 g of 1-hexene were added. Ethylene was then introduced again into the reactor in order to obtain the desired partial pressure of ethylene of $10 \times 10^5$ Pa. The temperature and partial pressure of ethylene were kept constant during the polymerisation period in order to obtain the desired amount of copolymer, thereby yielding the desired weight ratio between on the one hand the homopolymer produced in the first polymerisation step and on the other hand the copolymer produced in the second copolymerisation step. The reaction was then stopped by cooling down, and then venting, the reactor.

The resulting polyethylene resin comprising the low molecular weight and high molecular weight fractions chemically blended together, was then collected from the reactor.

D. Pelletisation of the Polyethylene Resin

The polyethylene resin was pelletised using an extruder (same as that employed in Example 1). The properties of the pelletised resin blend are summarised in Table II.

EXAMPLE 3

The operations of Example 2 were repeated, except that the polymerisation conditions (the molar ratio of hydrogen to ethylene, the 1-hexene content and the ethylene partial pressure) in steps B and C were varied in order to obtain ethylene polymers having different densities and/or melt indices, and except that the proportions of the low molecular weight and high molecular weight polyethylene fractions in the blend were changed by varying the duration of the first and second polymerisation steps. The composition and properties of the resultant polyethylene resins thereby obtained are summarised also in Table II.

COMPARATIVE EXAMPLES 16 to 19

In these Comparative Examples, the operations of Example 2 were again repeated, except that the polymerisation conditions (molar ratio) of hydrogen to ethylene, 1-hexene content, and ethylene partial pressure in the first and second polymerisation steps were adapted in order to obtain ethylene polymers having different densities and/or melt indices and/or except that the proportions of the low molecular weight and high molecular weight polyethylene fractions of the blends were changed by adapting the duration of the first and second polymerisation steps.

The composition and properties of the resultant polyethylene resins are summarised in Table II.

EXAMPLE 4

A. Catalyst Preparation

Ethylene bis(4,5,6,7-tetrahydro-1-indenyl) zirconium dichloride was prepared in accordance with the method of Brintzinger as published in Journal of Organometallic Chemistry, 288 (1985) pages 63 to 67.

The support used in a silica having a total pore volume of 4.217 ml/g and a surface area of 322 $m^2/g$. This silica was further prepared by drying in high vacuum on a schlenk line for three hours to remove the physically absorbed water. 5 g of this silica were suspended in 50 ml of toluene and placed in a round bottom flask equipped with magnetic stirrer, nitrogen inlet and dropping funnel.

An amount of 0.31 g of the metallocene was reacted with 25 ml of methylalumoxane (MAO 30 wt % in toluene) at a temperature of 25° C. for a period of 10 minutes to give a solution mixture of the corresponding metallocenium cation and the anionic methylalumoxane oligomer.

Then the resulting solution comprising the metallocenium cation and the anionic methylalumoxane oligomer was added to the support under a nitrogen atmosphere via the dropping funnel which was replaced immediately after with a reflux condenser. The mixture was heated to 110° C. for 90 minutes. Then the reaction mixture was cooled down to room temperature, filtered under nitrogen and washed with toluene.

The catalyst obtained was then washed with pentane and dried under a mild vacuum.

B. Preparation of the Polyethylene Resin

The manufacture of a polyethylene resin comprising a blend of low molecular weight and high molecular weight ethylene polymers was carried out in suspension in isobutane in two loop reactors connected in series.

Isobutane, ethylene, hydrogen, triisobutyl aluminium (TIBAL) and catalyst (prepared according to the method described in section A above) were continuously introduced into the first loop reactor and the polymerisation of ethylene was carried out in this mixture in order to form the low molecular weight homopolymer. The polymerisation conditions are specified in Table III. The mixture, additionally comprising the low molecular weight homopolymer, was continuously withdrawn from the first loop reactor and was subjected to a reduction in pressure, so as to remove the hydrogen. The resulting mixture was then continuously introduced into a second loop reactor serially connected to the first loop reactor together with ethylene 1-hexene and isobutane. The polymerisation of the ethylene and 1-hexene was carried out therein in order to form the high molecular weight copolymer. The suspension comprising the polyethylene resin blend of the low molecular weight and high molecular weight ethylene polymer fractions was continuously withdrawn from the second loop reactor. The suspension was subjected to a final reduction in pressure, so as to evaporate the isobutane and the remaining reactants present (ethylene, 1-hexene and hydrogen) and to recover the polyethylene resin in the form of a powder, which was subject to drying in order to complete the de-gasing of the isobutane. The polymerisation conditions in the second reactor are also specified in Table III.

The properties of both the low molecular weight and high molecular weight polyethylene resin fractions and also of the ultimate polyethylene resin, are specified in Table IV, together with further measurements of the capillary viscosity and dynamic viscosity of the ultimate polyethylene resin blend.

C. Use of the Composition for the Preparation of Pipes

The polyethylene resin obtained in step B was mixed with 3000 ppm by weight of an anti-oxidising agent, which comprised the compound having the trade name Irganox B225 commercially available from the company CIBA Speciality Chemicals and with 2.25% by weight of carbon black. The resultant compound was granulated by extrusion in a twin screw extruder available under the trade name ZSK 58 from the company Werner & Pfleiderer at a temperature of 215° C.

Thereafter, pipes were manufactured by extrusion of these pellets through a single screw extruder at a temperature of 200° C. Pipes having a diameter of 110 mm were extruded through a single screw extruder available in commerce from the company Krauss Mafei under the trade name KME 1-70-30B. These pipes had an SDR value of 11, the SDR being the ratio of external diameter to thickness.

The resins were tested to determine the environmental stress crack resistance (ESCR) using the FNCT and notched pipe tests, the creep resistance, the rapid crack propagation and the Charpy impact energy. The results are summarised in Table V.

COMPARATIVE EXAMPLE 20

Example 4 was repeated by using different polymerisation conditions in both the first and second reactors and the different conditions are summarised in Table III. The resultant properties of the low molecular weight and high molecular weight fractions and also of the ultimate blended resin are also summarised in Table IV. Table IV also specifies the capillary and dynamic viscosity of the ultimate resin. The resin was also subjected to the same ESCR (using the FNCT and notched pipe tests), creep resistance, rapid crack propagation and Charpy impact energy tests as the resin of Example 4 and the results are summarised in Table V.

COMPARATIVE EXAMPLE 21

The polyethylene resin of this Comparative Example comprised a commercially available PE100 compound and the properties of the compound are summarised in Tables IV and V.

Comparison of Results

From a comparison of Example 1 with Comparative Examples 1 to 15 it may be seen that the resin in accordance with the invention has a significantly higher environmental stress cracking resistance as measured by the Bell test than the resin blends not produced in accordance with the invention. Furthermore, from a comparison of Examples 2 to 3 with the results of Comparative Examples 16 to 19, it may also be seen that the environmental stress cracking resistance as measured both by the Bell test and by the FNCT test significantly enhanced with the resin produced in accordance with the present invention. Furthermore, when the resin of Example 4 is compared to the resin of Comparative Example 20 and of Comparative Example 21, corresponding to a commercially available PE100 compound, it may be seen that the resin produced in accordance with the invention has good environmental stress crack resistance as determined both by the FNCT test and the notch pipe test, and significantly higher creep resistance that those of the Comparative Examples. In addition, the resin produced in accordance with the invention has resistance to rapid crack propagation and a Charpy impact energy which substantially correspond to or are greater than those of the Comparative Examples and of the known commercially available PE100 resin.

Furthermore, it may be seen that the polyethylene resins produced in accordance with the invention and obtained with the preferred metallocene catalysts, especially the THI catalyst, have a capillary viscosity $\mu_2$ lower than that of commercial PE100 Ziegler-Natta pipe resins. Accordingly, at higher shear rates the resins of the invention can exhibit improved processability as compared to the known PE100 resins. In addition, the polyethylene resins produced in accordance with the invention also have an $\eta_{0.01}$ significantly greater than 200,000 Pa.s, the typical maximum value for commercially available PE100 Ziegler-Natta pipe resins. Accordingly at lower shear rates the resins of the invention can exhibit improved resistance to sagging for extruded pipes, for example, as compared to known PE100 resins. In addition, the resins produced in accordance with the invention, in general have an $\eta_{0.01}/\eta_1$ greater than 8, preferably greater than 10, which is greater than the maximum value of 8 typically exhibited by commercially available PE100 Ziegler-Natta pipe resins. This again demonstrates that the resins of the invention exhibit higher viscosity at low shear rates and lower viscosity at high shear rates as compared to known PE100 resins. This means that the resins of the invention exhibit in combination not only improved processability, particularly for extrusion of pipes, but also improved resistance to sagging following extrusion.

TABLE I

| | LMW FRACTION | | | | HMW FRACTION | | | | RESIN BLEND | | | | | |
|---|---|---|---|---|---|---|---|---|---|---|---|---|---|---|
| | P1 Wt % | MI2 g/10' | Density Kg/m³ | Mw/Mn | p2 wt % | HLMI g/10' | Density Kg/m³ | Mw/Mn | MI5 dg/min | HLMI dg/min | Density Kg/m³ | 1-Hexene g/Kg | Mw/Mn | ESCR Bell h |
| Ex. 1 | 0.55 | 185.0 | 972.5 | 2.6 | 0.45 | 0.24 | 926.0 | 3.7 | 0.63 | 22.0 | 952.5 | 5.0 | 10.5 | >850 |
| Comp. Ex 1 | 0.58 | 103.0 | 970.8 | | 0.42 | 0.19 | 931.5 | 4.7 | 0.84 | 28.0 | 956.9 | 3.0 | 11 | <18 |
| Comp. Ex 2 | 0.65 | 11.5 | 964.7 | 2.8 | 0.35 | 0.17 | 933.6 | 4.6 | 0.83 | 17.0 | 955.0 | | 7.2 | <18 |
| Comp. Ex 3 | 0.75 | 3.3 | 961.1 | 2.9 | 0.25 | 0.30 | 934.8 | 4.7 | 1.50 | 22.0 | 955.1 | | 4.5 | <18 |
| Comp. Ex 4 | 0.85 | 2.1 | 959.9 | 2.9 | 0.15 | 0.10 | 927.8 | 5.6 | 1.70 | 23.0 | 955.2 | 3.0 | 4.4 | <18 |
| Comp. Ex 5 | 0.80 | 2.1 | 959.9 | 2.9 | 0.20 | 0.16 | 927.8 | 4.4 | 1.00 | 17.0 | 949.1 | 9.0 | 4.6 | <18 |
| Comp. Ex 6 | 0.64 | 21.0 | 966.4 | 2.7 | 0.36 | 0.10 | 927.8 | 5.6 | 0.78 | 19.4 | 953.5 | 3.0 | 7.6 | <18 |
| Comp. Ex 7 | 0.50 | 185.0 | 972.5 | 2.6 | 0.50 | 0.39 | 935.2 | 4.6 | 0.52 | 15.9 | 956.2 | 3.0 | 10.9 | <23 |
| Comp. Ex 8 | 0.52 | 200.0 | 972.7 | 2.5 | 0.48 | 0.17 | 933.6 | 4.6 | 0.36 | 13.6 | 956.8 | 4.0 | 12.6 | <23 |
| Comp. Ex 9 | 0.56 | 45.0 | 968.5 | 2.7 | 0.44 | 0.17 | 933.6 | 4.6 | 0.48 | 13.3 | 954.3 | | 9.2 | <17 |
| Comp. Ex 10 | 0.59 | 32.0 | 967.5 | 3.1 | 0.41 | 0.10 | 927.1 | 4.3 | 0.79 | 21.0 | 954.5 | 2.0 | 9.3 | 20 |
| Comp. Ex 11 | 0.66 | 11.5 | 964.7 | 2.8 | 0.34 | <0.1 | 923.5 | | 0.82 | 17.5 | 950.3 | 7.0 | 6.4 | 50 |
| Comp. Ex 12 | 0.49 | 200.0 | 972.7 | 2.5 | 0.51 | 0.17 | 933.6 | 4.6 | 0.23 | 8.3 | 955.2 | | 11.7 | <15 |

TABLE I-continued

| | LMW FRACTION | | | | HMW FRACTION | | | | RESIN BLEND | | | | | |
|---|---|---|---|---|---|---|---|---|---|---|---|---|---|---|
| | P1 Wt % | MI2 g/10' | Density Kg/m$^3$ | Mw/Mn | p2 wt % | HLMI g/10' | Density Kg/m$^3$ | Mw/Mn | MI5 dg/min | HLMI dg/min | Density Kg/m$^3$ | 1-Hexene g/Kg | Mw/Mn | ESCR Bell h |
| Comp. Ex 13 | 0.52 | 13.0 | 965.0 | 3.1 | 0.48 | 0.17 | 933.6 | 4.6 | 0.24 | 6.1 | 952.4 | | 8.3 | 15–24 |
| Comp. Ex 14 | 0.70 | 0.6 | 956.3 | 3.4 | 0.30 | 0.39 | 935.2 | 4.6 | 0.39 | 6.5 | 950.7 | | 4 | <17 |
| Comp. Ex 15 | 0.84 | 0.4 | 954.8 | 3.3 | 0.16 | 0.22 | 920.0 | 4.0 | 0.62 | 8.5 | 950.2 | 4.0 | 3.8 | <15 |

TABLE II

| | LMW Fraction (1st Step) | | | HMW Fraction (2nd Step) | | | RESIN BLEND | | | | | ESCR | |
|---|---|---|---|---|---|---|---|---|---|---|---|---|---|
| | p1 wt % | MI2 g/10' | Density Kg/m$^3$ | p2 wt % | HLMI* g/10' | Density* Kg/m$^3$ | MI5 dg/min | HLMI dg/min | Density kg/m$^3$ | Hexene g/Kg | Mw/Mn | Bell Test h | FNCT h |
| Ex. 2 | 0.58 | 330.0 | 973.0 | 0.42 | 0.04 | 922.4 | 0.41 | 18.5 | 953.3 | 4 | 14.3 | >500 | 627 |
| Ex. 3 | 0.60 | 335.0 | 973.3 | 0.4 | 0.02 | 917.7 | 0.38 | 19.9 | 952.5 | 6 | 14.9 | >500 | >4820 |
| Comp. Ex. 16 | 0.90 | 0.99 | 957.4 | 0.10 | 0.02 | 913.8 | 1.17 | 15.9 | 953.4 | 2 | 4.8 | <16 | |
| Comp. Ex. 17 | 0.80 | 1.2 | 956.9 | 0.20 | 0.27 | 927.2 | 0.90 | 15.2 | 951.7 | 4.5 | 4.7 | 20–24 | |
| Comp. Ex. 18 | 0.60 | 66.6 | 968.9 | 0.40 | 0.02 | 939.2 | 0.28 | 11.4 | 958.5 | | 10.4 | <16 | |
| Comp. EX. 19 | 0.53 | 160.0 | 972.1 | 0.47 | 0.02 | 934.1 | 0.14 | 5.7 | 956.0 | | 12.5 | 16.25 | 6 |

*calculated.

TABLE III

| | Example 4 | Comp. Example 20 |
|---|---|---|
| REACTOR 1 | | |
| C$_2$ (% mol) | 20.9 | 16.2 |
| Comonomer | — | — |
| H$_2$/C$_2$ (% mol/mol) | 0.0588 | 0.0427 |
| T (° C.) | 80 | 80 |
| residence time (h) | 1.82 | 1.83 |
| REACTOR 2 | | |
| C$_2$ (% mol) | 12.80 | 14.97 |
| C$_6$/C$_2$ (% mol/mol) | 3.1 | 9.1 |
| H$_2$/C$_2$ (% mol/mol) | — | — |
| T (° C.) | 75 | 75 |
| residence time (h) | 0.89 | 0.87 |

TABLE IV

| | Example 4 | Comp. Example 20 | Comp. Example 21 (Commercial PE 100) |
|---|---|---|---|
| LMW fraction (reactor 1) | | | |
| weight (%) | 56.9 | 55.5 | |
| MI$_2$ (g/10 min) | 459 | 149 | |
| Density (kg/m$^3$) | 974.2 | 971.0 | |
| HMW fraction (reactor 2) | | | |
| weight (%) | 43.1 | 44.5 | |
| HLMI (g/10 min)* | 0.03 | 0.04 | |
| Density (kg/m$^3$)* | 919.4 | 919.6 | |
| Polyethylene resin blend | | | |
| hexene g/kg | 9 | 10 | |
| MI$_5$ (g/10 min) | 0.26 | 0.2 | 0.34 |
| HLMI (g/10 min) | 15.6 | 10.1 | 10.7 |
| Density (kg/m$^3$) | 952.2 | 949.5 | ~950** |
| μ$_2$ (dPa · s) | 16,800 | 19,900 | >21,000 |
| η$_{0.01}$ (Pa · s) | 587,960 | 675,480 | ≤200,000 |

TABLE IV-continued

| | Example 4 | Comp. Example 20 | Comp. Example 21 (Commercial PE 100) |
|---|---|---|---|
| η$_1$ (Pa · s) | 39,722 | 43,426 | |
| η$_{0.01}$/η$_1$ | 14.8 | 15.6 | <8 |

*calculated
**commercial PE 100 resins usually have a density around 960 kg/m$^3$, but contain carbon black; the density of the resin can therefore be estimated as around 950 kg/m$^3$.

TABLE V

| | Example 4 | Comp. Example 20 | Comp. Example 21 (Commercial PE 100) |
|---|---|---|---|
| ESCR | | | |
| FNCT 5 MPa, 80° C. (h) | >4700 | >4700 | 300 |
| Notched pipe test 4.6 MPa, 80° C. (h) | 3081 | >2182 | 1000 |
| Creep Resistance 20° C. (h) | | | |
| at 13.0 Mpa | >2000 | 400 | 200 |
| at 13.7 Mpa | 1274 | | |
| at 13.9 Mpa | 242 | | |
| Rapid Crack Propagation Critical temperature (S4) (critical pressure 10 bars) | −12.5 to −15° C. | <−20° C. | −5 to −15° C. |
| Charpy Impact Energy (kJ/m$^2$) (−25° C.) | 14 | 19 | 10 |

The invention claimed is:

1. A polyethylene resin comprising from 35 to 49 wt % of a first polyethylene fraction of high molecular weight and from 51 to 65 wt % of a second polyethylene fraction having a lower molecular weight than said first polyethylene fraction:
  (a) said first polyethylene fraction comprising a linear low density polyethylene having a density of no more than 0.928 g/cm³, and a high load melt index, HLMI, of less than 0.6 g/10 min;
  (b) said second polyethylene fraction comprising a high density polyethylene having a density of at least 0.969 g/cm³ and a melt index, $MI_2$ of greater than 100 g/10 min.; and
  (c) said polyethylene resin having a density of greater than 0.951 g/cm³, a high load melt index, HMLI, within the range of 1–100 g/10 min and being effective when formed into a high strength pipe to provide such having a creep resistance measured according to ISO 1167 on a 32mm diameter SDR11 pipe of at least 500 hours at 20° C. and 13 MPa and a stress crack resistance measured according to the full notch creep test of ISO DIS 16770 of at least 500 hours measured at 80° C. and 5 MPa.

2. A polyethylene resin according to claim 1 wherein said first polyethylene fraction is present in an amount of no more than 45 wt. %, and said second polyethylene fraction is present in an amount of at least 55 wt. %.

3. A polyethylene resin according to claim 1 wherein said second polyethylene fraction has a melt index, $MI_2$, within the range of 200–1,000 g10 min.

4. A polyethylene resin according to claim 3 wherein said second polyethylene fraction baa a melt index, $MI_2$, within the range of 300–1,000 g/10 min.

5. A polyethylene resin according to claim 3 wherein said first polyethylene fraction has a high load melt index, HLMI, within the range of 0.001–0.5 g/10 min.

6. A polyethylene resin according to claim 3 wherein said first polyethylene fraction has a high load melt index, HLMI, within the range of 0.01–0.35 g/10 min.

7. A polyethylene resin according to claim 1 wherein said first polyethylene fraction has a density within the range of 0.908–0.927 g/cm².

8. A polyethylene resin according to claim 7 wherein said second polyethylene fraction has a density within the range of 0.97–0.99 g/cm².

9. A polyethylene resin according to claim 1 wherein said second polyethylene fraction has a polydispersity index D within the range of 2–4.

10. A polyethylene resin according to claim 9 wherein said first polyethylene fraction has a polydispersity index D within a range of 3–6.

11. A polyethylene resin according to claim 1 having a density within the range of 0.952–0.96 g/cm³.

12. A polyethylene resin according to claim 11, having a high load melt index, HLME, within the range of 5–90 g/10 min.

13. A polyethylene resin according to claim 11, having a high load melt index, HLME, within the range of 10–80 g/10 min.

14. A polyethylene resin according to claim 1 wherein said first polyethylene fraction is a co-polymer of ethylene and a $C_3$–$C_{12}$ alpha olefin.

15. A polyethylene resin according to claim 14 wherein said second polyethylene fraction comprises an ethylene homopolymer.

16. A polyethylene resin according to claim 14 wherein said first polyethylene fraction comprises a co-polymer of ethylene and a comonomer selected from the group consisting of butene, methylpentene, hexene, and mixtures thereof.

17. A pipe or pipe fitting formed of the polyethylene resin of claim 1.

18. A high strength pipe formed of ethylene polymer resin having a multimodal molecular weight distribution and a density greater than 0.951 g/cm³, formed of a polyethylene resin comprising from 35 to 49 wt. % of a first polyethylene fraction of a high molecular weight and from 51 to 65 wt% of a second polyethylene fraction having a lower molecular weight than said first polyethylene fraction:
  (a) said first polyethylene fraction comprising a linear low density polyethylene having a density of no more than 0.928 g/cm³, and a high load melt index, HLMI, of less than 0.6 g/10 min.;
  (b) said second polyethylene fraction comprising a high density polyethylene having a density of at least 0.969 g/cm³ and a melt index, $MI_2$, of greater than 100 g/10 min.; and
  (c) said polyethylene resin having a density greater than 0.951 g/cm³, a high load melt index, HMLI, within the range of 1–100 g/10 min, the pipe having a creep resistance measured according to ISO 1167 on a 32 mm diameter SDR 11 pipe of at least 500 hours at 20° C. and 13 MPa and a stress crack resistance measured according to the full notch creep test of ISO DIS 16770 of at least 500 hours measured at 80° C. and 5 MPa.

19. A process for the preparation of a polyethylene resin having a bimodal molecular weight distribution which comprises:
  (a) contacting ethylene monomer and a first co-reactant selected from the group consisting of hydrogen and a comonomer comprising a $C_3$–$C_{12}$ alpha olefin in a first reaction zone under first polymerization conditions to produce a first polyethylene in the presence of a first catalyst system;
  (b) contacting ethylene monomer and a second co-reactant selected from the group consisting of hydrogen and a comonomer comprising a $C_{3-C12}$ alpha olefin in a second reaction zone under second polymerization conditions to produce a second polyethylene different from said first polyethylene in the presence of a second catalyst system; and
  (c) blending together said first and second polyethylenes to form a polyethylene resin comprising a blend of from 35 to 49 wt% of a polyethylene fraction of high molecular weight and from 51 to 65 wt. % of a low molecular weight polyethylene fraction having a lower molecular weight than said high molecular weight polyethylene fraction, said high molecular weight polyethylene fraction comprising a linear low density polyethylene having a density of no more than 0.928 g/cm³, and a high load melt index, HLMI, of less than 0.6 g/10 min. and the lower molecular polyethylene fraction comprising a high density polyethylene having a density of at least 0.969 g/cm³ and a melt index, $MI_2$, of greater than 100 g/10 min.; said polyethylene resin having a density greater than 0.951 g/cm³, and a high load melt index, HMLI, within the range of 1–100 g/10 min and being effective when formed into a high strength pipe to provide such pipe having a creep resistance measured according to ISO 1167 on a 32 mm diameter SDR 11 pipe of at least 500 hours at 20° C. and 13 MPa and a stress crack resistance measured according to the full notch creep test of ISO DIS 16770 of at least 500 hours measured at 80° C. and 5 MPa.

20. The process of claim 19 wherein said first polyethylene comprises a high-density ethylene homopolymer, and said second polyethylene comprises a copolymer of ethylene and a $C_3$–$C_2$ alpha olefin comonomer.

21. The process of claim 20 wherein said $C_3$–$C_{12}$ alpha olefin comonomer is selected from the group consisting of butene, hexane, hexene, methylpentene, octene and mixtures thereof.

22. The process of claim 20 wherein said comonomer comprises hexene.

23. The process of claim 20 wherein said first and second reaction zones are connected in series and said first polyethylene is supplied from said first reaction zone to said second reaction zone.

24. The process of claim 23 wherein said first co-reactant is hydrogen and said second co-reactant comprises a $C_3$–$C_{12}$ alpha olefin.

25. The process of claim 23 wherein each of said catalysts in said first and second reaction zones includes a metallocene catalyst component comprising a bridged bis(tetrahydroindenyl) compound of the general formula $R''(IndH_4)_2 MQ_2$ in which each $IndH_4$ is the same or different and is tetrahydroindenyl or substituted tetrahydroindenyl, R" is a bridge between the $IndH_4$ groups which comprises a $C_1$–$C_4$ alkylene radical, a dialkyl germanium or silicon or siloxane, or an alkyl phosphine or amine radical, which bridge is substituted or unsubstituted, M is a Group IV metal or vanadium and each Q is a hydrocarbyl having 1 to 20 carbon atoms or a halogen; and a cocatalyst which activates the catalyst component.

26. The high strength pipe of claim 18 wherein said ethylene polymer resin comprises a first polyethylene fraction of high molecular weight in an amount within the range of 35–49 wt. % and a second polyethylene fraction having a lower molecular weight than said first polyethylene fraction in an amount within the range of 51–65 wt. %.

27. The high strength pipe of claim 26 wherein said first polyethylene fraction is present in an amount of no more than 45 wt. % and said second polyethylene fraction is present in an amount of at least 55 wt. %.

* * * * *